US010870072B2

(12) United States Patent
Herber et al.

(10) Patent No.: US 10,870,072 B2
(45) Date of Patent: Dec. 22, 2020

(54) CLARIFIER TANK INSERT ASSEMBLY

(71) Applicant: United Rentals, Inc., Seal Beach, CA (US)

(72) Inventors: Douglas J. Herber, San Marcos, TX (US); Bruce J. Lesikar, San Marcos, TX (US)

(73) Assignee: UNITED RENTALS, INC., Stamford, CT (US)

( * ) Notice: Subject to any disclaimer, the term of this patent is extended or adjusted under 35 U.S.C. 154(b) by 0 days.

(21) Appl. No.: 16/402,519

(22) Filed: May 3, 2019

(65) Prior Publication Data

US 2019/0336889 A1 Nov. 7, 2019

Related U.S. Application Data

(60) Provisional application No. 62/667,306, filed on May 4, 2018.

(51) Int. Cl.
| | | |
|---|---|---|
| *B01D 21/02* | (2006.01) | |
| *B01D 21/00* | (2006.01) | |
| *C02F 1/52* | (2006.01) | |
| *B01D 21/08* | (2006.01) | |
| *B01D 21/24* | (2006.01) | |
| *C02F 103/10* | (2006.01) | |

(52) U.S. Cl.
CPC ..... *B01D 21/0042* (2013.01); *B01D 21/0003* (2013.01); *B01D 21/0045* (2013.01); *B01D 21/08* (2013.01); *B01D 21/2444* (2013.01); *C02F 1/52* (2013.01); *C02F 2103/10* (2013.01)

(58) Field of Classification Search
CPC ............ B01D 21/0003; B01D 21/0042; B01D 21/0045; B01D 21/2444

USPC ................................ 210/521, 522, 540, 802
See application file for complete search history.

(56) References Cited

U.S. PATENT DOCUMENTS

| | | | |
|---|---|---|---|
| 3,940,337 A | | 2/1976 | Robison |
| 4,346,005 A | * | 8/1982 | Zimmerman ...... B01D 21/0045 210/521 |
| 4,793,926 A | * | 12/1988 | Vion ...................... B01D 21/02 210/521 |
| 4,957,628 A | | 9/1990 | Schultz |
| | | (Continued) | |

FOREIGN PATENT DOCUMENTS

| | | |
|---|---|---|
| CA | 1308036 C | 9/1992 |
| CA | 2833412 C | 6/2016 |

OTHER PUBLICATIONS

International Search Report and Written Opinion issued in PCT/US19/30560, dated Jul. 12, 2019.

*Primary Examiner* — Christopher Upton
(74) *Attorney, Agent, or Firm* — K&L Gates LLP (57) ABSTRACT

A clarifier tank insert assembly configured to be inserted into a frac tank. The clarifier tank insert assembly includes a housing that defines a housing interior and includes a bottom opening, at least a first plate pack assembly disposed in the housing interior, and at least a first pipe positioned within the housing interior and above the first plate pack assembly. The first plate pack assembly includes at least first and second parallel plates and the first plate defines a plate angle with the bottom surface of the housing. The first pipe includes a plurality of inflow openings defined therein. A water path extends through the bottom opening, between the first and second parallel plates and into the inflow openings in the pipe.

5 Claims, 9 Drawing Sheets

(56) References Cited

U.S. PATENT DOCUMENTS

| | | | | |
|---|---|---|---|---|
| 5,028,333 | A * | 7/1991 | Wright | B01D 21/0045 210/521 |
| 5,552,050 | A * | 9/1996 | Valentin | B01D 21/2444 210/540 |
| 5,829,718 | A | 11/1998 | Smith | |
| 6,605,224 | B2 * | 8/2003 | Aymong | B01D 17/00 210/802 |
| 2008/0314823 | A1 * | 12/2008 | Kulick, III | B01D 21/0003 210/521 |
| 2010/0243585 | A1 * | 9/2010 | Dissinger | B01D 21/0045 210/802 |
| 2012/0312741 | A1 * | 12/2012 | Pashaian | B01D 21/0045 210/521 |
| 2014/0083921 | A1 | 3/2014 | McPhee | |
| 2017/0050124 | A1 * | 2/2017 | Feldthusen | B01D 21/0003 |

* cited by examiner

CLARIFIER TANK INSERT ASSEMBLY

CROSS REFERENCE TO RELATED APPLICATIONS

This application claims the benefit of U.S. Provisional Application No. 62/667,306, filed May 4, 2018, the entireties of which are incorporated herein by reference.

FIELD OF THE INVENTION

The present invention relates generally to a clarifier tank insert assembly, and more particularly to a clarifier tank assembly for use with a frac tank.

BACKGROUND OF THE INVENTION

A clarifier is designed to provide settling of the materials suspended in the water. A coagulant or flocculant can be used to assist in the floc formation and settling. The hydraulic loading rate is the volume of water which can be loaded to the clarifier surface. A traditional clarifier effective surface area is calculated by determining the free water surface of the clarifier.

The present inventive clarifier system presented utilizes lamella slant plate clarifier technology. The invention uses parallel-plates spaced between about 1 to about 2 inches apart to decrease the settling distance for particles. The particles settle to the lower plate surface and then slide down on the surface to the bottom of the clarifier. The lamella slant plate has an effective surface area calculated by projecting an equivalent horizontal plane from the slanted plate surface. Therefore an inclined plate with an angle of 55°, with a plate length of 8 feet and width of 4 feet projects a surface area of 18.35 ft$^2$. The formula for this is the surface area of the individual plate=L×W or (Cosine 55×8 feet)×4 feet.

SUMMARY OF THE INVENTION

In accordance with a first aspect of the present invention there is provided a clarifier tank insert assembly configured to be inserted into a frac tank. The clarifier tank insert assembly includes a housing that defines a housing interior and includes a bottom opening, at least a first plate pack assembly disposed in the housing interior, and at least a first pipe positioned within the housing interior and above the first plate pack assembly. The first plate pack assembly includes at least first and second parallel plates and the first plate defines a plate angle with the bottom surface of the housing. The first pipe includes a plurality of inflow openings defined therein. A water path extends through the bottom opening, between the first and second parallel plates and into the inflow openings in the pipe. Preferably, the plate angle is an acute angle.

In a preferred embodiment, the housing includes first and second hanging beams that extend outwardly from the housing and are configured to rest on a top surface of the tank. Preferably, the first plate pack assembly includes at least a first support member that includes first and second angled slots defined therein. The first plate is received in the first angled slot and the second plate is received in the second angled slot. Preferably, the first support member is positioned on a rail that is located in the housing interior. In a preferred embodiment, the housing includes at least a first divider therein that divides the housing interior into first and second pockets. The first plate pack assembly is disposed in the first pocket and a second plate pack assembly is disposed in the second pocket.

In a preferred embodiment, the clarifier insert tank assembly includes a weir member that includes first and second opposite ends and at least first and second openings defined therein. A second pipe is positioned within the housing interior and above the first plate pack assembly. The first and second pipes each include an outflow end and the outflow end of the first pipe is in flow communication with the first opening in the weir member and the outflow end of the second pipe is in flow communication with the second opening in the weir member. The first and second opposite ends are movable upwardly and downwardly independent one another. Preferably, first and second flanges extend inwardly from the first and second sides of the housing. One of a first adjustment hole and a first adjustment slot is defined in the first flange and the other of the first adjustment hole and first adjustment slot is defined in the first end of the weir member. A first bolt extends through the first adjustment hole and first adjustment slot. The first bolt can include a nut or the like thereon to secure the first bolt in place. The nut can be loosened to move the first bolt and adjust the height of the first end of the weir member. One of a second adjustment hole and a second adjustment slot is defined in the second flange and the other of the second adjustment hole and second adjustment slot is defined in the second end of the weir member. A second bolt extends through the second adjustment hole and second adjustment slot. The second bolt can include a nut or the like thereon to secure the second bolt in place. The nut can be loosened to move the second bolt and adjust the height of the second end of the weir member.

In a preferred embodiment, the clarifier insert tank assembly includes at least a first beam member spanning the open top of the housing and at least a first adjustment assembly extending downwardly from the first beam member. The first adjustment assembly includes a threaded rod that includes an upper end that extends through an opening in the first beam member and a second end that includes a hanger loop engaged therewith. Rotation of the threaded rod moves the first pipe upwardly or downwardly.

The present invention is a clarifier designed to be inserted into an open top frac tank (with or without weirs). It can be used with other tanks, as desired. The existing and proposed solutions have average hydraulic and solids loading rates within standard practices guidelines for clarifiers. In a preferred embodiment, the present invention slant plate clarifier treatment system has approximately 50% more effective surface area than other existing insert systems. The system uses an adjustable weir and piping system for maintaining the proper water level in the system.

The clarifier system of the present invention utilizes a lamella slant plate clarifier technology. In a preferred embodiment, the system uses parallel-plates spaced between about 1 to 2 inches apart (the parts can be positioned closer or further apart, as desired) to decrease the settling distance for particles. The particles settle to the lower plate surface and then slide down on the surface to the bottom of the clarifier. The lamella slant plate has an effective surface area calculated by projecting an equivalent horizontal plane from the slanted plate surface. For example, an inclined plate with an angle of 55 degrees, with a plate length of 8 feet and width of 4 feet would project a surface area of 18.35 ft$^2$. The surface area of an individual plate is determined by the formula L×W or (Cosine 55×8 feet)×4 feet.

In a preferred embodiment, an assembled plate pack is placed within a containment, pocket or holder with a given surface area and dramatically increases the effective surface area. For example, a clarifier or pocket with a surface area of approximately 8 feet of width and 100 inches (8.33 feet) in length can hold the equivalent of 160 4'×8' slanted plates. Therefore, the assembled clarifier has an effective surface area of 2,936 ft². Therefore, it will be appreciated by those of ordinary skill in the art that the physical footprint of the clarifier is 67 ft², but the effective clarification surface area is 2,936 ft².

In a preferred embodiment, the present invention comprises lamella inserts placed in a pocket within a housing that is designed to be inserted into a mobile frac tank. In use, the slant plate clarifier has the solids settling to the bottom of the frac tank for removal using sludge removal piping laying in the bottom of the clarifier. In cases where there is limited sludge, the sludge can be removed after the insert is removed from the tank. The clarified water flows out four horizontal pipes through an adjustable weir plate or weir member into a discharge area where two outlets and hoses are connected between the holder and the discharge ports of the frac tank. In another embodiment there can be more or less horizontal pipes.

The present invention includes a unique mechanism for leveling the discharge pipes (e.g., four 4" pipes running across the top). When the frac tank is placed on the ground, very seldom is the ground, and thus the frac tank, level. The present invention focuses on leveling the discharge pipes which contain holes running down each side and a series of suspension holders. The suspension holders and weir plate are adjusted to allow leveling in all directions (side to side and front to back) within the clarifier discharge area. This leveling mechanism allows the system to maintain a consistent flow across all the clarifier insert plates because the holes in the discharge pipe are at the same elevation and thus draw water uniformly from above the clarifier plates. In a preferred embodiment, to begin the leveling process, four bolts securing the weir plate are loosened and the weir plate is leveled from side to side by sliding the bolts in vertical slotted holes. It will be appreciated that four bolts is only exemplary and any number of bolts or other fastener or threaded fastener is within the scope of the invention. Once leveled, the bolts are secured to hold the now level weir plate in place. Next each of the four pipes, independent suspension holders are adjusted to level each pipe from front to back of the clarifier unit. The suspension holders are leveled with respect to the now level weir plate by adjusting the length of rod exposed between the suspended pipe and clarifier top frame. Once all of the pipes are leveled from front to back, using the suspension holder, a final check is made to verify the pipes are also level side to side. Additionally, verification is made that the two rows of holes in the discharge pipes are properly oriented.

Preferably each of the plate pack assemblies are removable from the housing. In another embodiment they can be permanently secured in the housing. Preferably, the clarifier tank insert assembly is removable from the frac tank. In another embodiment, the clarifier tank insert assembly can be permanently secured in the frac tank. In another embodiment, multiple clarifier tank insert assemblies can be used in a single frac tank. In another embodiment, the adjustment features can be used with a clarifier tank insert assembly that includes plates that are vertically oriented or with any other clarifier tank insert assembly or similar device for clarifying water. The hanging beams can be small beams that extend outwardly from the housing, as opposed to be a single beam that spans the housing. The support members can be a single unit that includes slots for receiving the plates, but includes an opening or openings therethrough that allow water to pass therethrough.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, the figures show a clarifier tank insert assembly 10 that can be used in a frac tank 100. Generally, the clarifier tank insert assembly 10 includes a housing 12, a plurality of plate pack assemblies 14, an adjustable pipe assembly 16 that includes a plurality of pipes 18, and a weir member 20.

Figure 1:
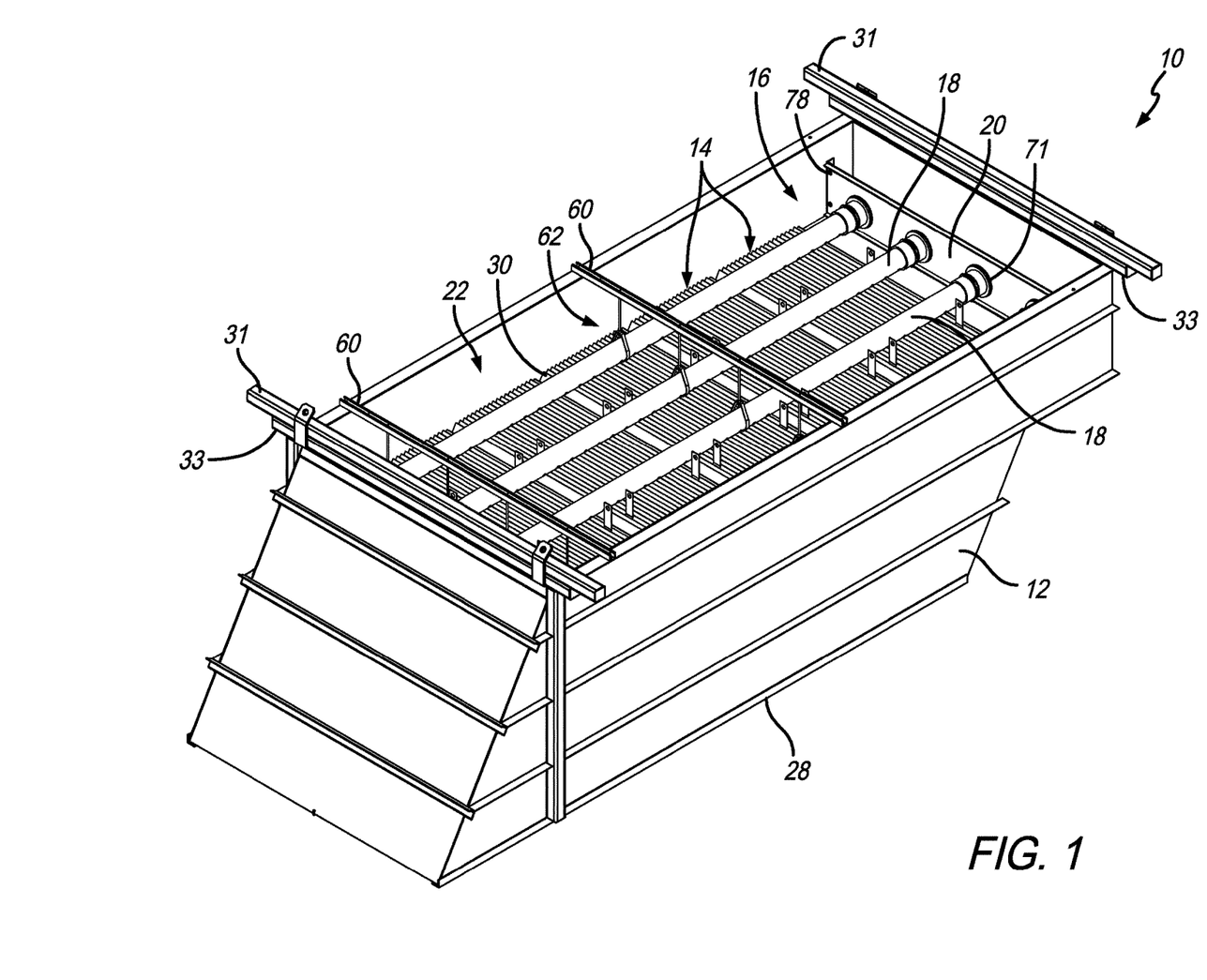
FIG. 1 is a perspective view of a clarifier tank insert assembly in accordance with a preferred embodiment of the present invention.
Figure 2:
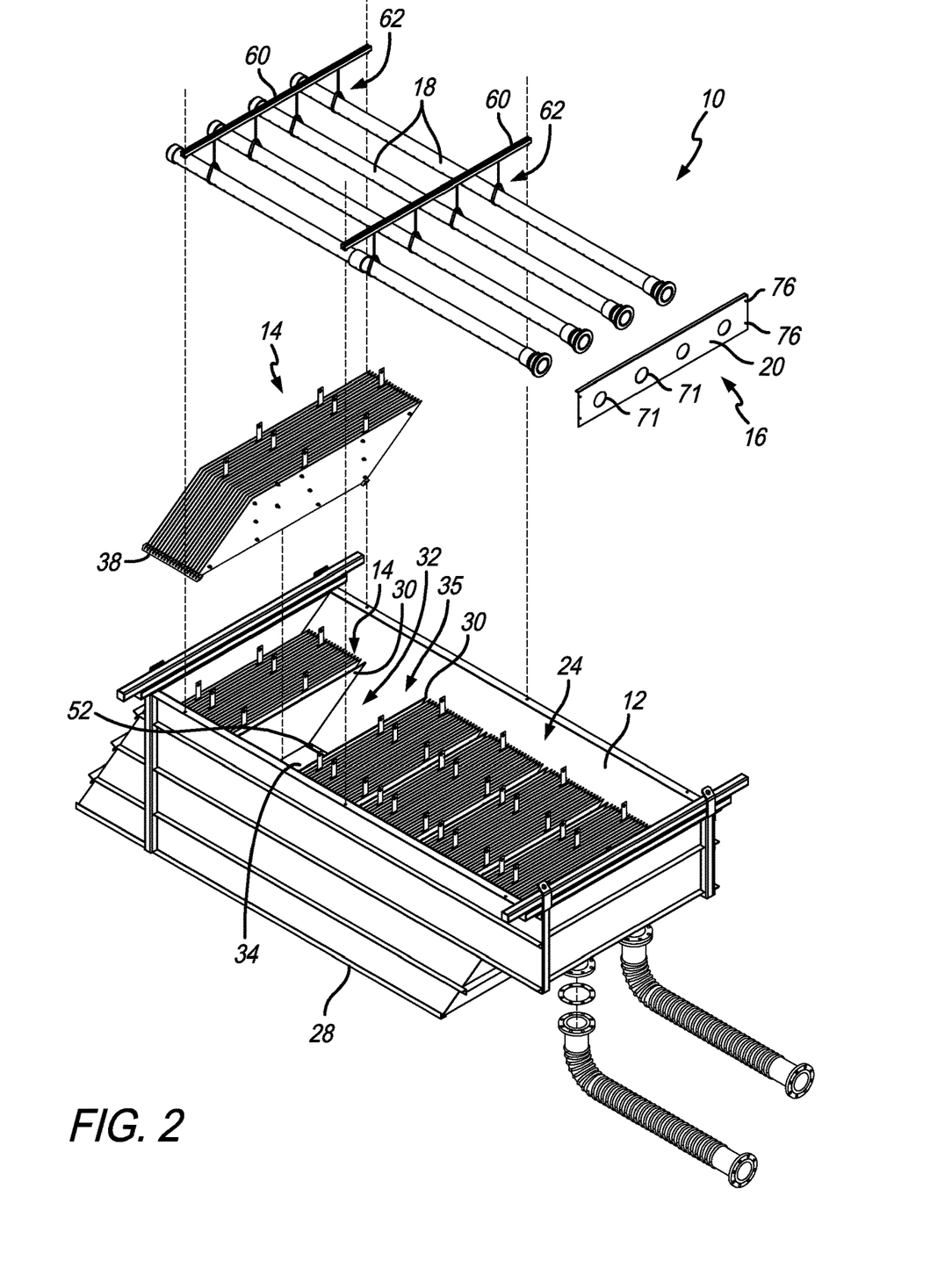
FIG. 2 an exploded perspective view of the clarifier tank insert assembly of FIG. 1.
Figure 3:
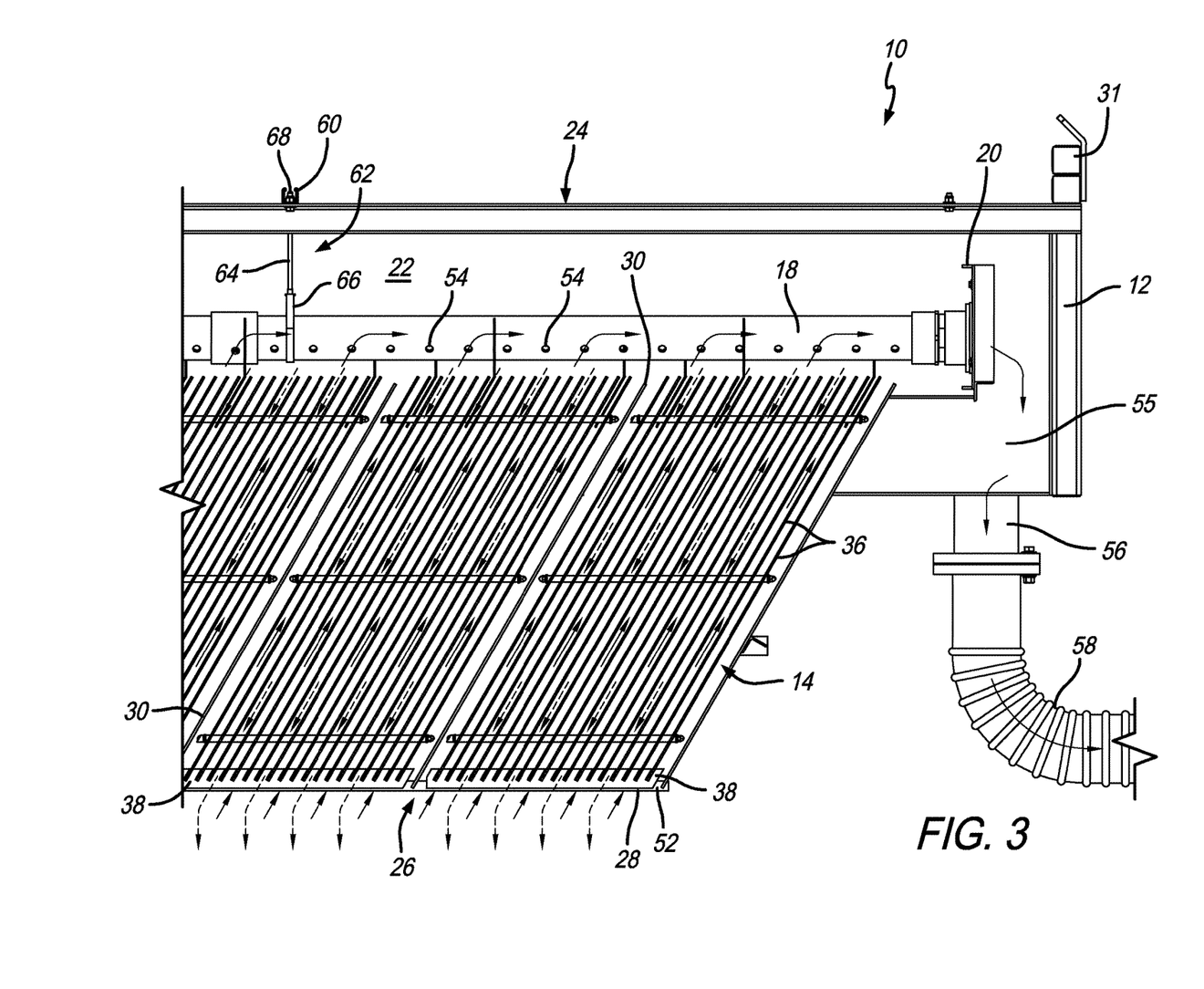
FIG. 3 is a side elevational view of a portion of the interior of the clarifier tank insert assembly of FIG. 1.

As shown in FIGS. 1-3, in a preferred embodiment, the housing 12 generally includes a housing interior 22, an open top 24, open bottom 26, a bottom surface 28, a plurality of angled divider members 30 and hanging beams 31 that are used to suspend the clarifier tank insert assembly 10 when it is inserted into a frac tank, as described below. The divider members 30 divide a portion of the housing interior 22 into separate pockets 32 that each receive a plate pack assembly 14. Each pocket 32 includes a bottom opening 34 and a top opening 35.

Figure 4:
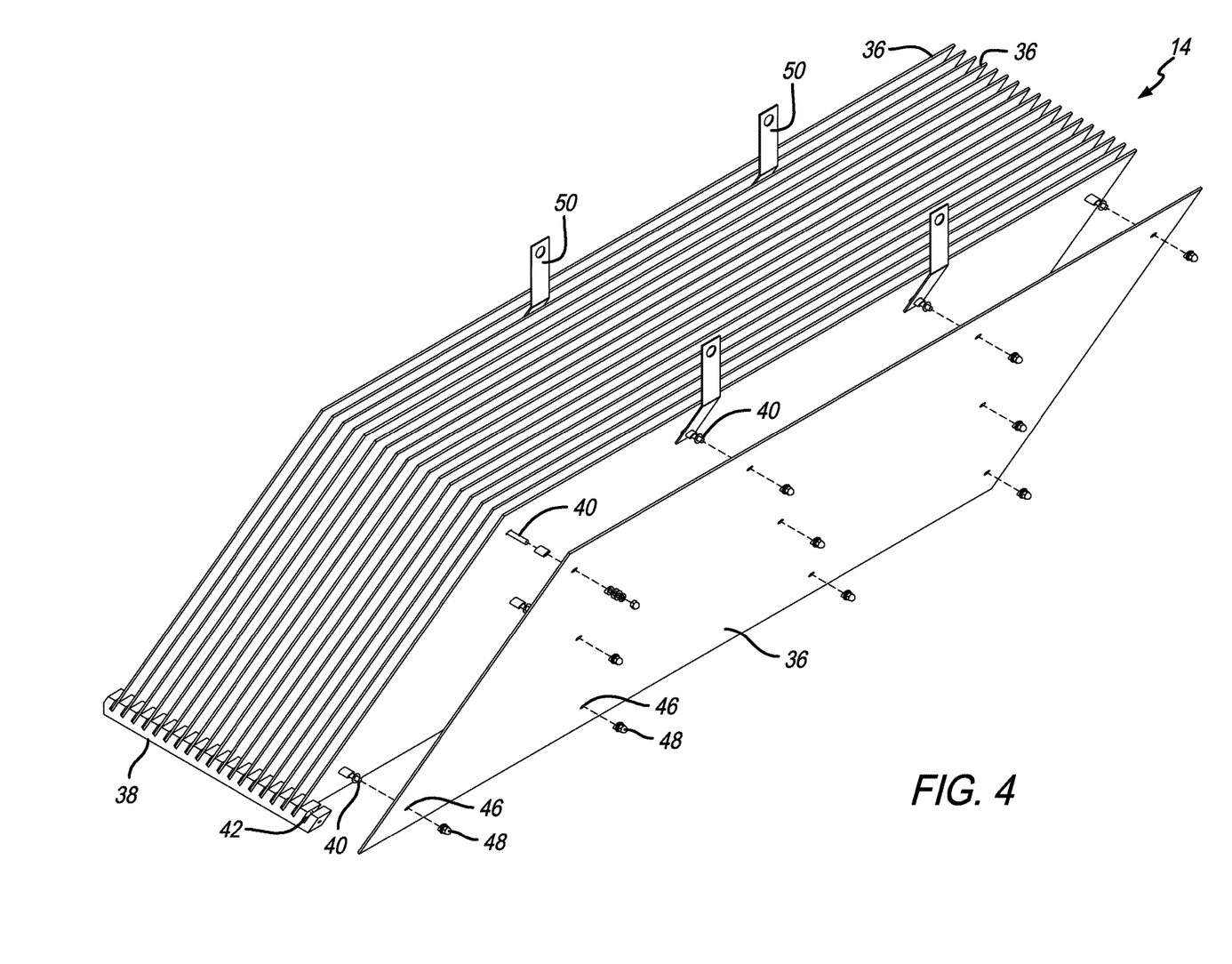
FIG. 4 is a perspective view of a plate pack assembly with one plate exploded therefrom.
Figure 5:
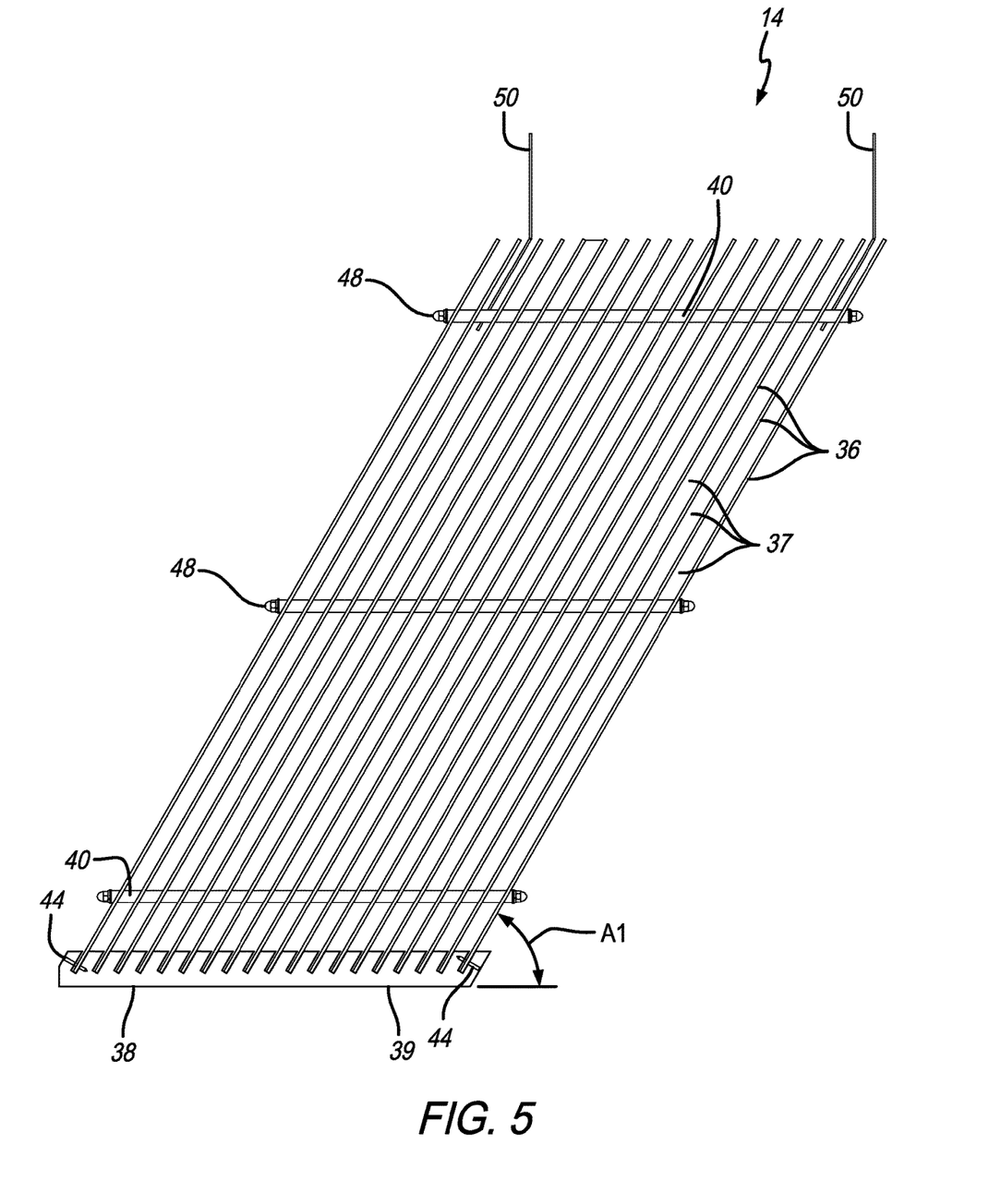
FIG. 5 is a side elevational view of a plate pack assembly.

As shown in FIGS. 4-5, each of the plate pack assemblies 14 includes a plurality of plates 36 that define a plate space 37 therebetween. In a preferred embodiment, the plate pack assemblies 14 also include support members 38, and rods 40 that secure the pack together. The support members 38 include angled slots 42 defined therein that receive the plates 36 therein. In a preferred embodiment, fasteners 44 can be used to secure the plates 36 in the slots 42. The rods 40 extend through a series of openings 46 defined in each of the plates 36. In a preferred embodiment, the ends of the rods 40 are threaded and nut caps 48 are placed on the ends thereof to secure the rods 40 in place. In another embodiment, the rods can be secured in place via other means. In a preferred embodiment, the plate pack assemblies 14 include brackets 50 that are attached to the plates or rods and can be used to remove the plate pack assemblies 14 from the housing 12. In use, a rope, cable or the like can be attached to the brackets 50 and the holes therein and the plate pack assemblies can be lifted out of the pocket and the housing.

As shown in FIGS. 2-3, the plate pack assemblies 14 are positioned in a pocket 32 such that the support members 38 rest on rails 52 positioned on opposite sides of the pocket 32. Each of the pipes 18 include a plurality of inflow openings 54 defined therein. In a preferred embodiment, each pipe 18 includes two rows of inflow openings 54 that are located on opposite sides of the pipe 18 and extend lengthwise (parallel to the pipe axis) along the pipe 18.

Figure 6:
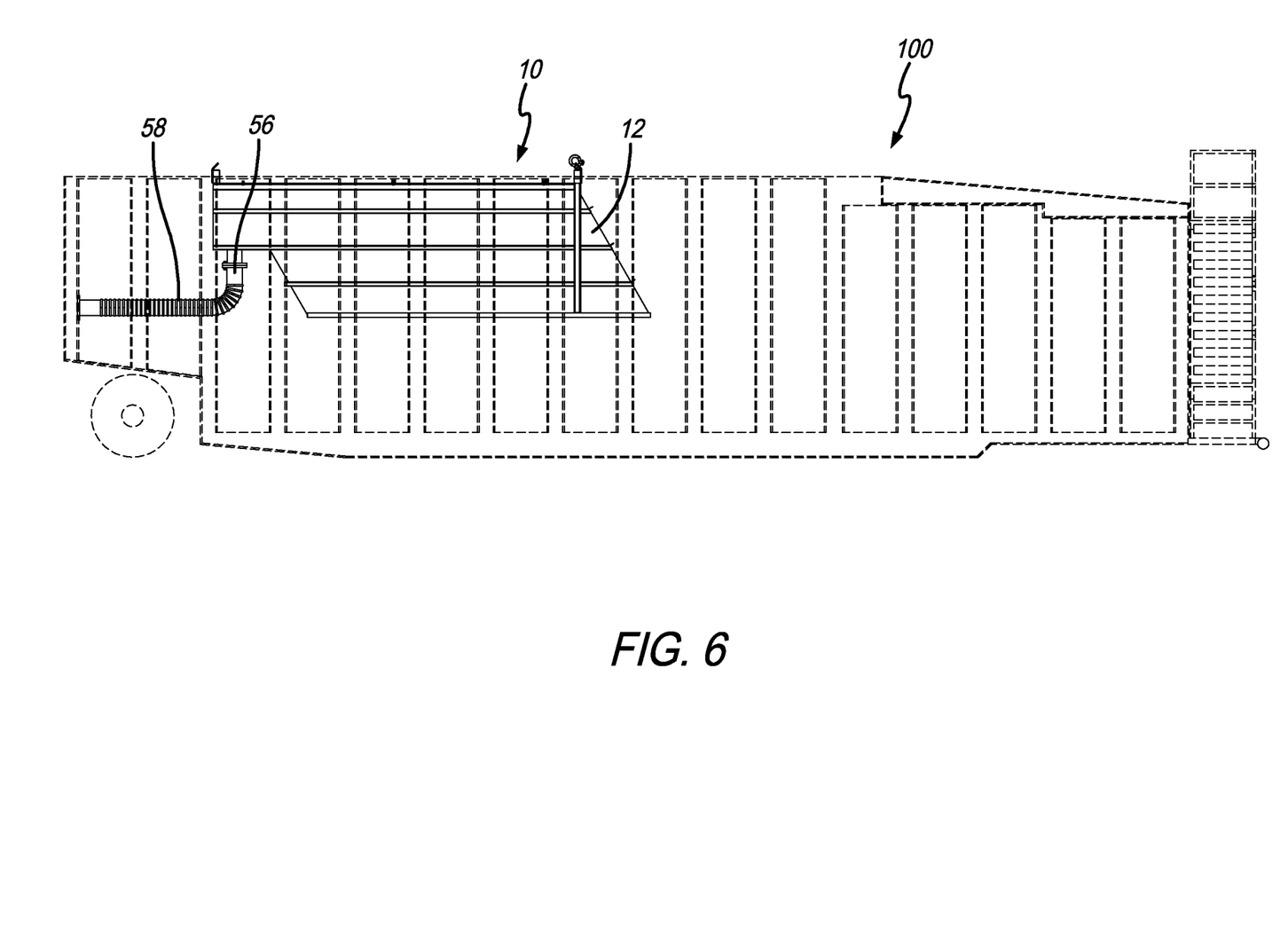
FIG. 6 is a 2 is a side elevational view of a frac tank with the clarifier tank insert assembly of FIG. 1 disposed therein.
Figure 7:
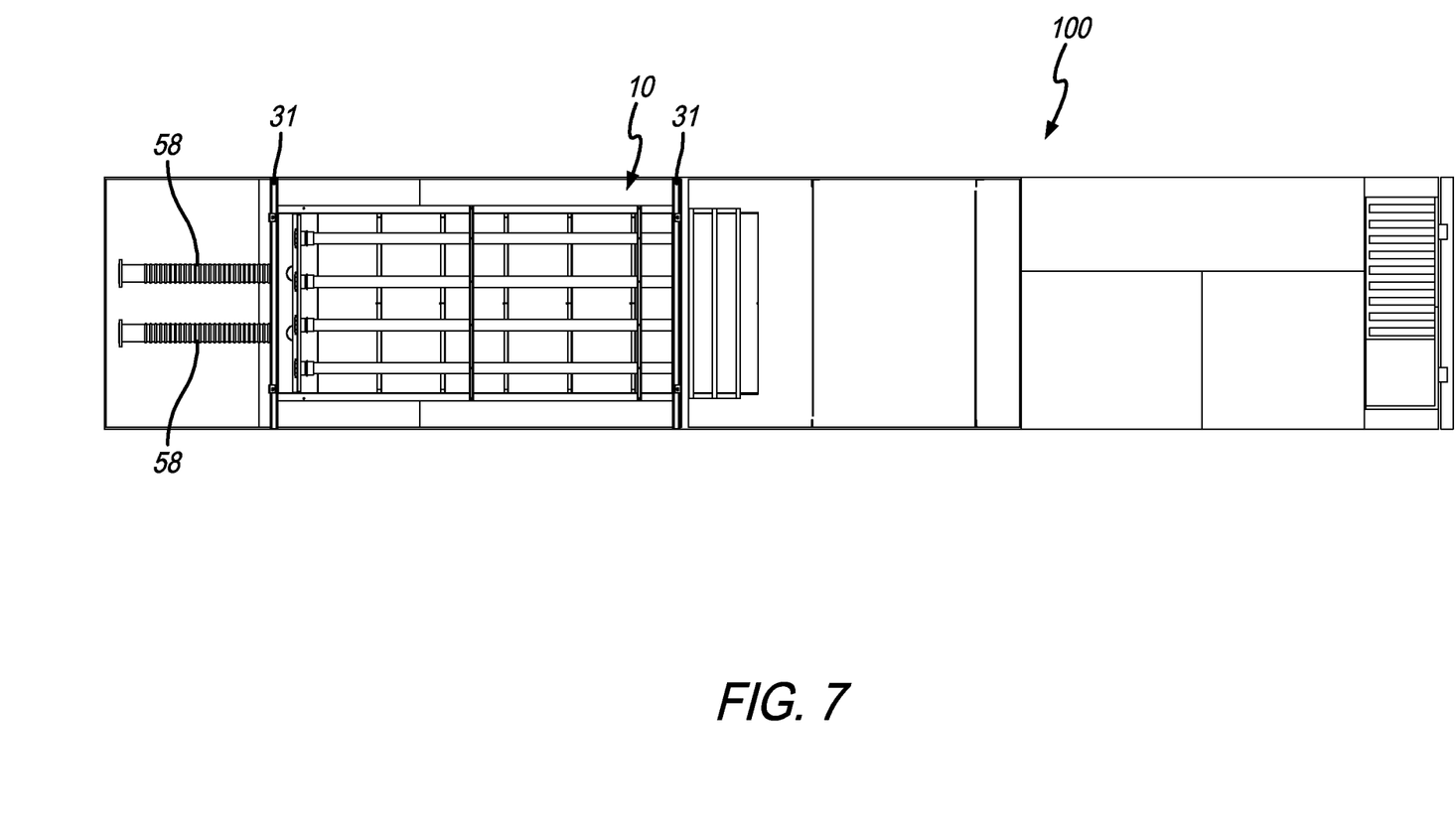
FIG. 7 is a top plan view of a frac tank with the clarifier tank insert assembly of FIG. 1 disposed therein.

In use, the clarifier tank insert assembly 10 is positioned in a frac tank 100 with dirty water therein, as shown in FIGS. 6 and 7. The type of frac tank is not a limitation on the present invention. The clarifier tank insert assembly 10 can be permanently secured in the tank 100 or can be temporarily position therein. For example, the hanging beams 31 can be placed on the top surface of the sides of the frac tank 100 such that the clarifier tank insert assembly 10 hangs down into the tank 100 (and the water therein), as shown in FIG. 6. The hanging beams 31 are long enough that the span the entire tank interior and rest on top of the tank 100. In a preferred embodiment, secondary beams 33 are positioned below the hanging beams 31 are of a length that they fit inside the tank interior and help prevent the assembly 10 from moving back and forth. In other words, the length of the secondary beams 33 is slightly smaller (e.g., between 0.1" and 3") than the dimension of the width of the interior of the tank. In another embodiment, the clarifier tank insert assembly can be used separately from a frac tank and may include a closed bottom. This allows the assembly 10 to be added or removed from a tank 100 based on the job site and whether the assembly 10 is needed.

FIG. 3 includes a series of arrows therein. The solid arrows represent the path of water moving through the assembly 10 and the plates, and the dashed arrows represent the path of particulate or flocculant settling out of the water. As a result of the hydraulic flow in the tank 100, dirty water or liquid enters through the open bottom 26 of the housing 12 (or through the bottom opening 34 in the pocket 32) and enters the plate space 37 between two plates 36. As the dirty water moves upwardly through the plate space 36, the particulates in the water begin to clump and join and then slide down the surface of the plate 36 and collect at the bottom of the tank. It will be appreciated by those of ordinary skill in the art that the plates 36 cause the velocity of water in the plate space 37 to slow down, thus allowing the heavier solids to settle and fall downwardly.

The clarified water flows through the plate spaces 37 and above the plate pack assemblies 14 and into the inflow openings 54 in the pipes 18 suspended above the plate pack assemblies 14, as shown in FIG. 3. The clarified water than flows out the end of the pipes 18, through the openings 71 in the weir member 20, into a discharge area or space 55, out one or more outlets 56 in the housing 12 and through pipe(s) or hose(s) 58 that direct the water out of the frac tank 100. It will be appreciated that the hose 58 with the clean water therein actually runs through the dirty water in the frac tank interior. It will be appreciated that the level of the water in the tank 100 is above the level of the inflow openings 54 in the pipes 18 so that the water in the tank 100 seeks an outlet through the openings 54 and eventually out of the assembly 10 and tank 100. As a result, leveling of the pipes 18 is important.

With reference to FIGS. 1, 2 and 8A-9B, in a preferred embodiment, the clarifier tank insert assembly 10 includes the ability to adjust the pipes 18 (referred to herein as an adjustable pipe assembly 16) both side to side (laterally or transversely) and end to end (longitudinally). The adjustable pipe assembly 16 includes at least first and second beam members 60 that span the open top 26 of the housing 12. The beam members 60 can be secured to the sides of the housing. The beam members 60 include adjustment assemblies 62 extending downwardly therefrom that secure the pipes 18 in place and suspend the pipes 18 above the plate pack assemblies 14. The adjustment assemblies 62 provide the ability to move the associated pipe 18 up or down. In a preferred embodiment, the adjustment assembly 62 includes a threaded rod 64 that extends through an opening in the beam member 60 at its upper end and extends through an opening in a hanger loop 66 at its lower end. Nuts 68 are threaded onto the opposite ends of the threaded rod 64 to secure the threaded rod 64 between the beam member 60 and the hanger loop 66. The hanger loop 66 defines a central opening 70 through which the pipe 18 extends.

Figure 8A:
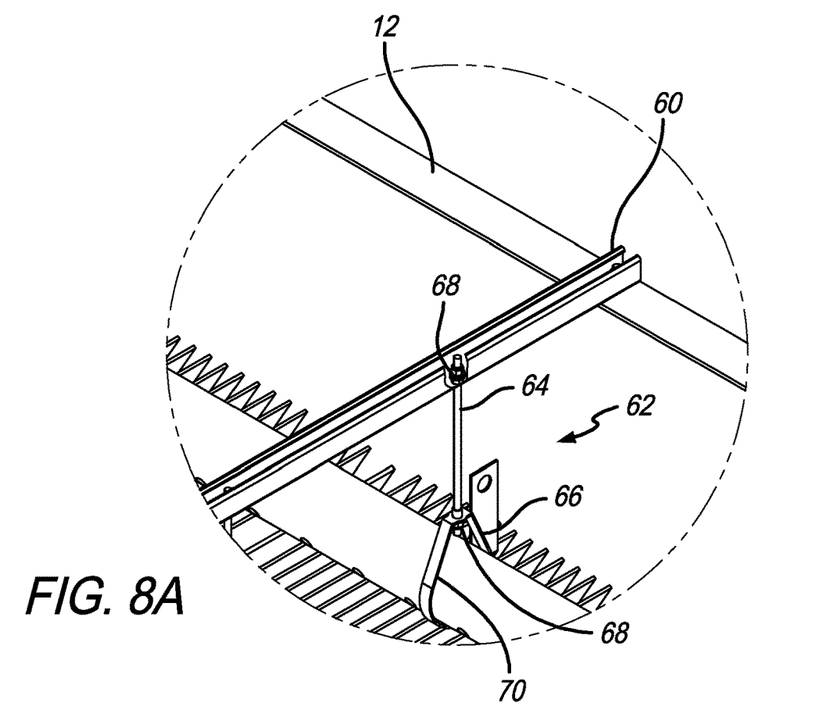
FIG. 8A is a perspective view of an adjustment assembly used for adjusting the height of the pipe.
Figure 8B:
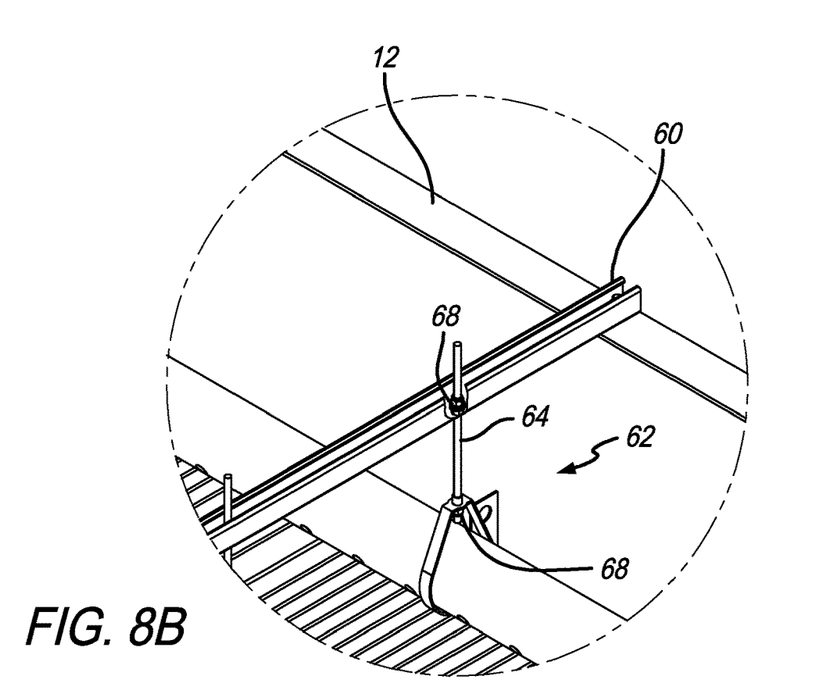
FIG. 8B is another perspective view of the adjustment assembly with the pipe at a higher position.

FIG. 8A shows the pipe 18 and the hanger loop 66 in a first position. FIG. 8B shows the pipe 18 and the hanger loop 66 in a second and higher position. In order to accomplish this, the nuts 68 are loosened and the threaded rod 64 is rotated such that it pulls the hanger loop 66 (and pipe) upwardly. Once the desired position is reached (e.g., where the pipe is level with the water along its length), the nuts 68 can be retightened to hold the pipe in place.

Figure 9A:
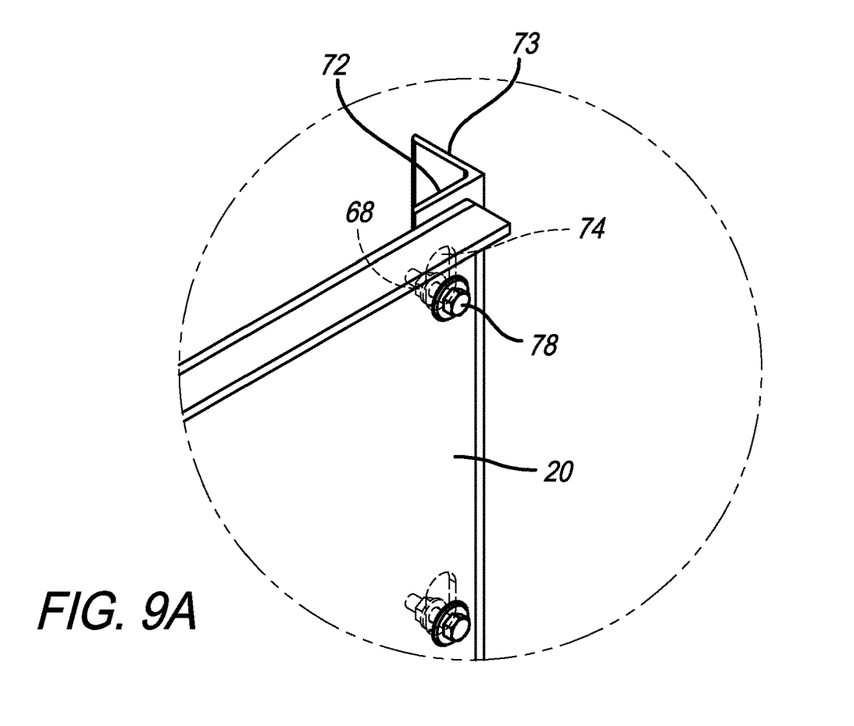
FIG. 9A is a perspective view of the weir member at a first position.
Figure 9B:
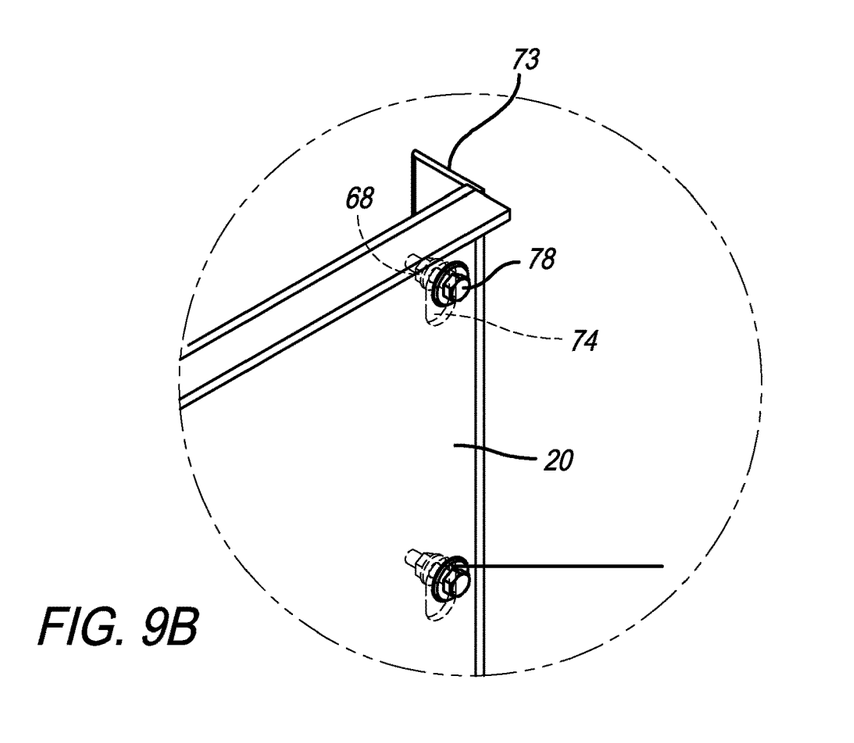
FIG. 9B is a perspective view of the weir member at a second and higher position.

FIGS. 9A and 9B show the side to side adjustment capability. As shown in FIG. 1, the weir member 20 spans the housing interior 22 and is secured to the side walls of the housing 12. The weir member 20 includes opening 71 that receive the ends of the pipes 18. Therefore, moving the weir member 20 up and down (or either end of the weir member up and down) moves the ends of the pipes up and down, thus providing further adjustment or leveling capability.

In a preferred embodiment, each side wall of the housing includes a flange 72 extending outwardly therefrom. For example, as shown in FIG. 9A, the flange 72 can be part of a piece of angle iron 73 that is secured to the side wall of the housing. The flange 72 on each side includes at least one and preferably two adjustment slots 74 defined therein. The weir member 20 includes adjustment openings 76 defined therein. A bolts 78 extends through each adjustment opening and into the adjustment slot 74. A nut 68 is used to secure the bolt in place. To adjust the height of one end of the weir member, the nut(s) 68 are loosened the weir member is moved upwardly or downwardly, which causes the bolt 78 to move upwardly or downwardly within the adjustment slot 74 and the nut(s) 68 are retightened. FIG. 9B shows one end of the weir member 20 in a higher position than it is shown in FIG. 9A. In another embodiment, the adjustment slot can be defined in the weir member and the adjustment opening can be defined in the flange.

In an exemplary use when the frac tank 100 is at a job site, a level is placed on the weir member 20 and the bolts 78 and adjustment slots 74 on one side (or both sides, as necessary) are used to move a side of the weir member 20 up or down to level the weir member 20, and thus the outlet or discharge end of the pipes 18. Then, a level is placed on each of the pipes, and the adjustment assemblies 62 are used to adjust the level of the pipes 18 end to end. Once the pipes 18 are leveled the water can placed in the frac tank 100.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. It will be appreciated that any dimensions given herein are only exemplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112,¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A clarifier tank insert assembly configured to be inserted into a tank, the clarifier tank insert assembly comprising:
    a housing that defines a housing interior and includes a bottom opening,
    at least a first plate pack assembly disposed in the housing interior, wherein the first plate pack assembly includes at least first and second parallel plates, wherein the first plate defines a plate angle with the bottom surface of the housing,
    at least a first pipe positioned within the housing interior and above the first plate pack assembly, wherein the first pipe includes a plurality of inflow openings defined therein,
    wherein a water path extends through the bottom opening, between the first and second parallel plates and into the inflow openings in the pipe; and
    further comprising a weir member that includes first and second opposite ends and at least first and second openings defined therein, wherein a second pipe is positioned within the housing interior and above the first plate pack assembly, wherein the first and second pipes each include an outflow end, wherein the outflow end of the first pipe is in flow communication with the first opening in the weir member and the outflow end of the second pipe is in flow communication with the second opening in the weir member, wherein the first and second opposite ends are movable upwardly and downwardly independent one another.

2. The clarifier insert tank assembly of claim 1 wherein first and second flanges extend inwardly from first and second sides of the housing, wherein one of a first adjustment hole and a first adjustment slot is defined in the first flange and the other of the first adjustment hole and first adjustment slot is defined in the first end of the weir member, wherein a first bolt extends through the first adjustment hole and first adjustment slot, wherein one of a second adjustment hole and a second adjustment slot is defined in the second flange and the other of the second adjustment hole and second adjustment slot is defined in the second end of the weir member, wherein a second bolt extends through the second adjustment hole and second adjustment slot.

3. A clarifier tank insert assembly configured to be inserted into a tank, the clarifier tank insert assembly comprising:
    a housing that defines a housing interior and includes a bottom opening, wherein the housing includes first and second hanging beams that extend outwardly from the housing and are configured to rest on a top surface of the tank, wherein the housing includes at least a first divider therein that divides the housing interior into first and second pockets,
    a first plate pack assembly that includes at least first and second parallel plates and a first support member that includes first and second angled slots defined therein, wherein the first plate is received in the first angled slot and the second plate is received in the second angled slot, wherein the first plate defines a plate angle with the bottom surface of the housing, wherein the first plate pack assembly is disposed in the first pocket, and wherein the first support member is positioned on a rail that is located in the first pocket,
    a second plate pack assembly that includes at least third and fourth parallel plates and a second support member that includes third and fourth angled slots defined therein, wherein the third plate is received in the third angled slot and the fourth plate is received in the fourth angled slot, wherein the second plate pack assembly is disposed in the second pocket, and wherein the second support member is positioned on a rail that is located in the second pocket, and wherein the first and second parallel plates of the first plate pack assembly, and the third and fourth parallel plates of the second plate pack assembly, are positioned substantially in series relative to each other,
    at least a first and second pipes positioned within the housing interior and above the first and second plate pack assemblies, wherein the first and second pipes each include a plurality of inflow openings defined therein,
    wherein a water path extends through the bottom opening, between the first and second parallel plates and into the inflow openings in the first pipe,
    further comprising a weir member that includes first and second opposite ends and at least first and second openings defined therein, wherein the first and second pipes each include an outflow end, wherein the outflow end of the first pipe is in flow communication with the first opening in the weir member and the outflow end of the second pipe is in flow communication with the second opening in the weir member, wherein the first and second opposite ends are movable upwardly and downwardly independent one another.

4. The clarifier insert tank assembly of claim 3 wherein first and second flanges extend inwardly from first and second sides of the housing, wherein one of a first adjustment hole and a first adjustment slot is defined in the first flange and the other of the first adjustment hole and first adjustment slot is defined in the first end of the weir member, wherein a first bolt extends through the first adjustment hole and first adjustment slot, wherein one of a second adjustment hole and a second adjustment slot is defined in the second flange and the other of the second adjustment hole and second adjustment slot is defined in the second end of the weir member, wherein a second bolt extends through the second adjustment hole and second adjustment slot.

5. The clarifier insert tank assembly of claim 4 further comprising at least a first beam member spanning the open top of the housing, and
- at least a first adjustment assembly extending downwardly from the first beam member, wherein the first adjustment assembly includes a threaded rod that includes an upper end that extends through an opening in the first beam member and a second end that includes a hanger loop engaged therewith, wherein rotation of the threaded rod moves the first pipe upwardly or downwardly.

\* \* \* \* \*